(12) United States Patent
Andre et al.

(10) Patent No.: US 9,886,070 B2
(45) Date of Patent: Feb. 6, 2018

(54) METHOD, SYSTEM, AND COMPUTER PROGRAM PRODUCT FOR TAKING AN I/O ENCLOSURE OFFLINE

(71) Applicant: INTERNATIONAL BUSINESS MACHINES CORPORATION, Armonk, NY (US)

(72) Inventors: Herve G. P. Andre, Orlando, FL (US); Gary W. Batchelor, Tucson, AZ (US); Scott A. Brewer, Tucson, AZ (US); Veronica S. Davila, Tucson, AZ (US); Enrique Q. Garcia, Tucson, AZ (US); Daniel I. Ibanez, Tucson, AZ (US); Trung N. Nguyen, Tucson, AZ (US); Louis A. Rasor, Tucson, AZ (US); Brian A. Rinaldi, Tucson, AZ (US); Micah Robison, Tucson, AZ (US); Todd C. Sorenson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/947,854

(22) Filed: Nov. 20, 2015

(65) Prior Publication Data
US 2017/0147049 A1    May 25, 2017

(51) Int. Cl.
*G06F 1/26* (2006.01)
*G06F 13/40* (2006.01)

(52) U.S. Cl.
CPC ............ *G06F 1/26* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 4,970,640 A | 11/1990 | Beardsley et al. |
| 5,295,258 A | 3/1994 | Jewett et al. |
| 5,668,532 A | 9/1997 | Beer et al. |
| 6,792,550 B2 | 9/2004 | Osecky et al. |

(Continued)

FOREIGN PATENT DOCUMENTS

EP   2083345   7/2009

OTHER PUBLICATIONS

Westphal, Axel, et al. IBM System Storage DS8000: Architecture and Implementation. Third ed., IBM Redbooks, Nov. 2012. 978-0-7384-3729-3. Accessed at http://techbus.safaribooksonline.com/book/databases/content-management-systems/0738437298 on Mar. 10, 2017.*

(Continued)

*Primary Examiner* — Kim Huynh
*Assistant Examiner* — Joshua Neveln
(74) *Attorney, Agent, or Firm* — Rabindranath Dutta; Konrad Raynes Davda & Victor LLP

(57) ABSTRACT

A storage controller determines a presence of an indication from an Input/Output (I/O) enclosure that the I/O enclosure will be powered off after a predetermined amount of time. The storage controller quiesces all I/O adapters of the I/O enclosure, in response to receiving the indication. The storage controller quiesces the I/O enclosure, in response to completion of quiescing of all of the I/O adapters of the I/O enclosure.

15 Claims, 9 Drawing Sheets

(56) References Cited

U.S. PATENT DOCUMENTS

| | | |
|---|---|---|
| 7,457,248 B1 * | 11/2008 | Ali ................. H04L 43/0811 370/235 |
| 7,822,959 B2 | 10/2010 | Cors et al. |
| 8,390,464 B1 | 3/2013 | Slifkin et al. |
| 8,954,808 B1 | 2/2015 | McLean et al. |
| 9,569,376 B1 | 2/2017 | Batchelor et al. |
| 2005/0076249 A1 * | 4/2005 | Kasprzak ................. G05F 1/40 713/300 |
| 2008/0270644 A1 | 10/2008 | Rooney et al. |
| 2014/0053017 A1 | 2/2014 | Bartlett et al. |
| 2014/0111932 A1 | 4/2014 | Fukuda et al. |
| 2014/0189088 A1 | 7/2014 | Grimes et al. |
| 2015/0193289 A1 | 7/2015 | Andre et al. |
| 2015/0263518 A1 | 9/2015 | Liu |
| 2015/0347251 A1 | 12/2015 | He et al. |

OTHER PUBLICATIONS

List of IBM Patents or Patent Applications Treated as Related, dated Nov. 20, 2015, pp. 2.
U.S. Appl. No. 14/947,864, filed Nov. 20, 2015.
Response dated Aug. 19, 2016, pp. 14, to Office Action dated May 19, 2016, pp. 25, for U.S. Appl. No. 14/947,864, filed Nov. 20, 2015.
"About preventing data corruption with I/O fencing About I/O fencing in SF Sybase CE environment", Symantec, received on Oct. 29, 2015, pp. 5.
Office Action dated May 19, 2016, pp. 25, for U.S. Appl. No. 14/947,864, filed Nov. 20, 2015.
Notice of Allowance dated Sep. 23, 2016, pp. 13, for U.S. Appl. No. 14/947,864, filed Nov. 20, 2015.

* cited by examiner

METHOD, SYSTEM, AND COMPUTER PROGRAM PRODUCT FOR TAKING AN I/O ENCLOSURE OFFLINE

BACKGROUND

1. Field

Embodiments relate to a method, system, and computer program product for taking an Input/Output (I/O) enclosure offline.

2. Background

In certain storage system environments, a storage controller (or a storage controller complex) may comprise a plurality of storage servers that are coupled to each other, where one or more of the storage servers may comprise a plurality of processing nodes or servers. The storage controller allows host computing systems to perform input/output (I/O) operations with storage devices controlled by the storage controller.

An I/O enclosure that includes I/O adapters may be used to provide a communication path among the storage controller, the storage devices, and the host computing systems. In certain situations, a plurality of I/O enclosures may be maintained to provide redundancy in the storage system environment.

In many situations the storage system environment may have hardware or software problems that may need to be resolved. Various mechanisms are available for recovery to help resolve software and hardware problems. Such recovery mechanisms may include suspension of I/O, software threads, software components, etc., in the storage system.

SUMMARY OF THE PREFERRED EMBODIMENTS

Provided are a method, a system, and a computer program product in which a storage controller determines a presence of an indication from an Input/Output (I/O) enclosure that the I/O enclosure will be powered off after a predetermined amount of time. The storage controller quiesces all I/O adapters of the I/O enclosure, in response to receiving the indication. The storage controller quiesces the I/O enclosure, in response to completion of quiescing of all of the I/O adapters of the I/O enclosure.

In additional embodiments, the storage controller fences the I/O enclosure and resources of all the I/O adapters, in response to completion of the quiescing of the I/O enclosure.

In further embodiments, the storage controller sends the I/O enclosure to an offline state by powering off the I/O enclosure, in response to quiescing the I/O enclosure.

In yet further embodiments, the I/O enclosure is a first I/O enclosure, wherein a second I/O enclosure takes over functions of the first I/O enclosure in response to the first I/O enclosure entering the offline state.

In additional embodiments, if the I/O enclosure is not sent to the offline state by the storage controller by being powered off within the predetermined amount of time, the I/O enclosure is powered off after an expiry of the predetermined amount of time.

In yet additional embodiments, the determining of the presence of the indication from the I/O enclosure is performed by polling the I/O enclosure by a server of the storage controller.

In further embodiments, the indication is provided by the I/O enclosure, wherein the I/O enclosure also starts a timer to power off the I/O enclosure after an expiry of the predetermined amount of time if the I/O enclosure does not receive a command from the storage controller to send the I/O enclosure to an offline state by powering off the I/O enclosure.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a timer based graceful quiesce and fence process for an I/O enclosure and for all I/O adapters included within the I/O enclosure, following the detection of a power cooling fault.

In high end storage systems when an I/O enclosure has a critical cooling fault the I/O enclosure may have to power down all components within the I/O enclosure to prevent damage to the components. A typical I/O enclosure may just shut down without notifying the system level code that manages the I/O enclosure. When this power down occurs, the system level code detects this by enclosure fabric failures. In order to recover from these I/O enclosure fabric failures the system level code may need to temporarily pause all I/O (e.g., up to 8 seconds) to all I/O enclosures to cleanup from the failing I/O enclosure errors. Thus due to this critical power cooling event all I/O to the system may be impacted for up to 8 seconds.

In high end storage systems this 8 second delay in I/O may be considered by many users as too long. Thus it is desirable to avoid impacting all I/O to the system when one I/O enclosure has a critical power cooling fault. Certain embodiments address this problem and other problems by gracefully taking the I/O enclosure offline before it powers down, thus minimizing any I/O impact to the rest of the system. Additionally the above system wide impact is avoided by proactively quiescing I/O through the resources in the I/O enclosure and fencing (i.e., isolating) the appropriate resources. This process in turn avoids the system wide impact of disruptive I/O recoveries (e.g., warmstart) caused by a critical cooling event in the I/O enclosure.

Exemplary Embodiments

Figure 1:
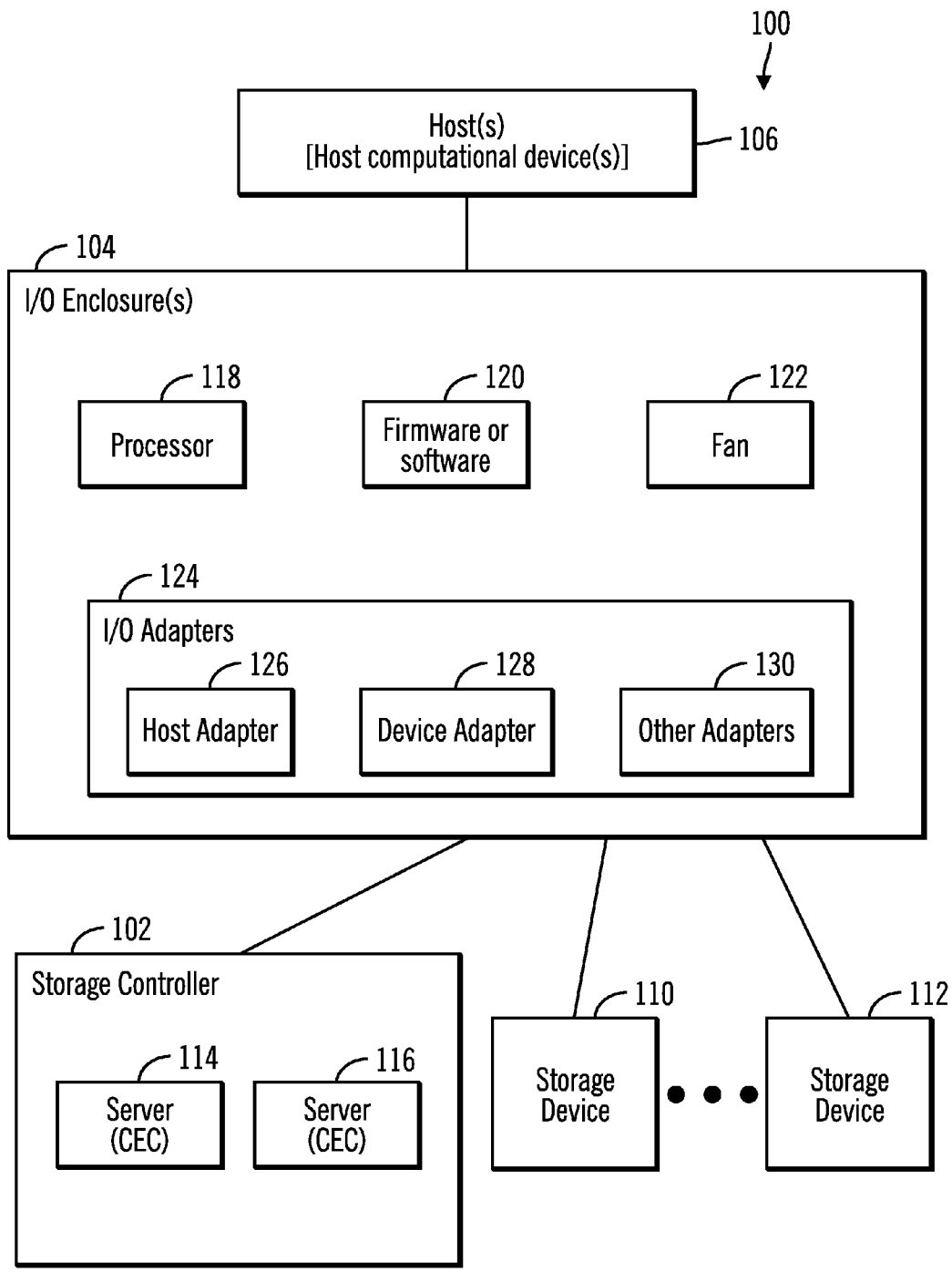
FIG. 1 illustrates a block diagram of a computing environment comprising a storage controller, an I/O enclosure, and one or more host computational devices, where the storage controller allows host computational devices to perform input/output (I/O) operations with storage devices controlled by the storage controller, in accordance with certain embodiments.

FIG. 1 illustrates a block diagram of a computing environment 100 comprising a storage controller 102, an I/O enclosure 104, and one or more host computational devices 106, where the storage controller 102 allows the host computational devices 106 to perform input/output (I/O) operations with one or more storage devices 110, 112 controlled by the storage controller 102, in accordance with certain embodiments. The I/O enclosure 104 provides a pathway for communications among the hosts 106, the storage controller 102, and the storage devices 110, 112. While only one I/O enclosure is shown in FIG. 1, in certain embodiments there may be a plurality of I/O enclosures to provide redundancy in case of a failure of one the I/O enclosures.

The storage controller 102 comprises a plurality of server computational devices 114, 116. The server computational devices 114, 116 may also be referred to as servers or central electronic complexes (CEC) or processor complexes. The storage controller 102 may comprise a set of hardware that includes central processing units (CPU), memory, channels, controllers, etc.

The servers 114, 116 of the storage controller 102, the storage controller 102, and the hosts 106 may comprise any suitable computational device including those presently known in the art, such as, a personal computer, a workstation, a server, a mainframe, a hand held computer, a palm top computer, a telephony device, a network appliance, a blade computer, a processing device, etc. The servers 114, 116, the storage controller 102, and the hosts 106 may be elements in any suitable network, such as, a storage area network, a wide area network, the Internet, an intranet. In certain embodiments, the servers 114, 116 may function redundantly and one server may be able to take over the operations of the other server. In certain embodiments, the servers 114, 116 of the storage controller 102, the storage controller 102, the hosts 106, the I/O enclosure 104, and the storage devices 110, 112 may be elements in a cloud computing environment.

The I/O enclosure 104 may include a processor 118, firmware or software 120, one or more fans 122, and one or more I/O adapters 124. The firmware or software 120 may in cooperation with the processor execute operations in the I/O enclosure 104. The fan 122 may be used for cooling the I/O enclosure and in case the fan 122 stops functioning properly the I/O enclosure 104 may overheat after a certain amount of time and damage may be caused to components of the I/O enclosure 104.

The I/O adapters 124 may include one or more host adapters 126 that connect to hosts 106, one or more device adapters 128 that connect to the storage devices 110, 112 and other adapters 130.

In certain embodiments, in the event of a critical cooling error in the I/O enclosure 104, the storage controller 102 first gracefully quiesces the I/O adapters 124, then quiesces the I/O enclosure 104, and then fences the I/O enclosure 104 and the resources of the I/O adapters 124. Once the I/O enclosure 104 and the resources of the I/O adapters 124 are fenced, the storage controller 102 sends the I/O enclosure 104 to an offline state by requesting the I/O enclosure 104 to power off.

Figure 2:
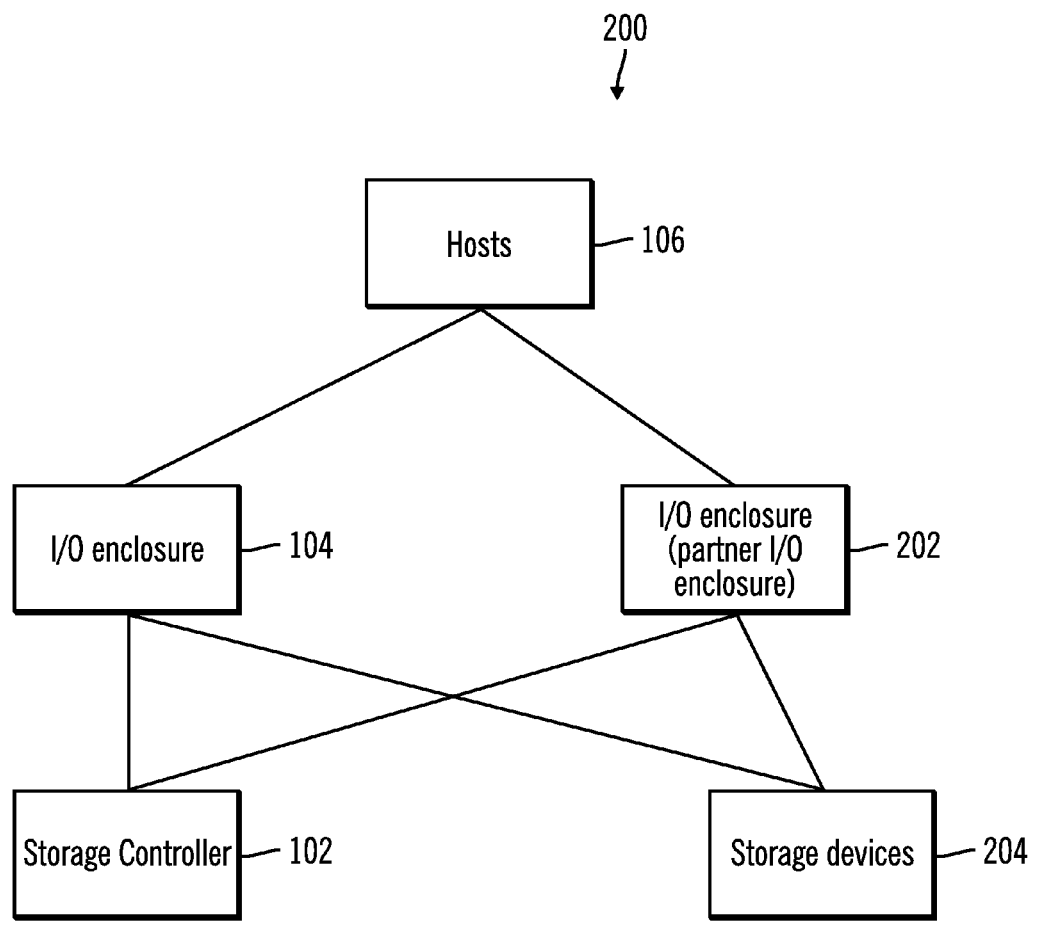
FIG. 2 illustrates a block diagram that shows a plurality of I/O enclosures for providing redundancy in communication among host computational devices, storage devices, and the storage controller, in accordance with certain embodiments.

FIG. 2 illustrates a block diagram 200 that shows a plurality of I/O enclosures 104, 202 for providing redundancy in communication among host computational devices 106, storage devices 204, and the storage controller 102, in accordance with certain embodiments. In case the I/O enclosure 104 is powered off, the I/O enclosure 202 may take over the functions of the I/O enclosure 104. Similarly if the I/O enclosure 202 is powered off, then the I/O enclosure 104 may take over the functions of the I/O enclosure 202. The I/O enclosure 202 may be referred to as the partner I/O enclosure of the I/O enclosure 104.

Figure 3:
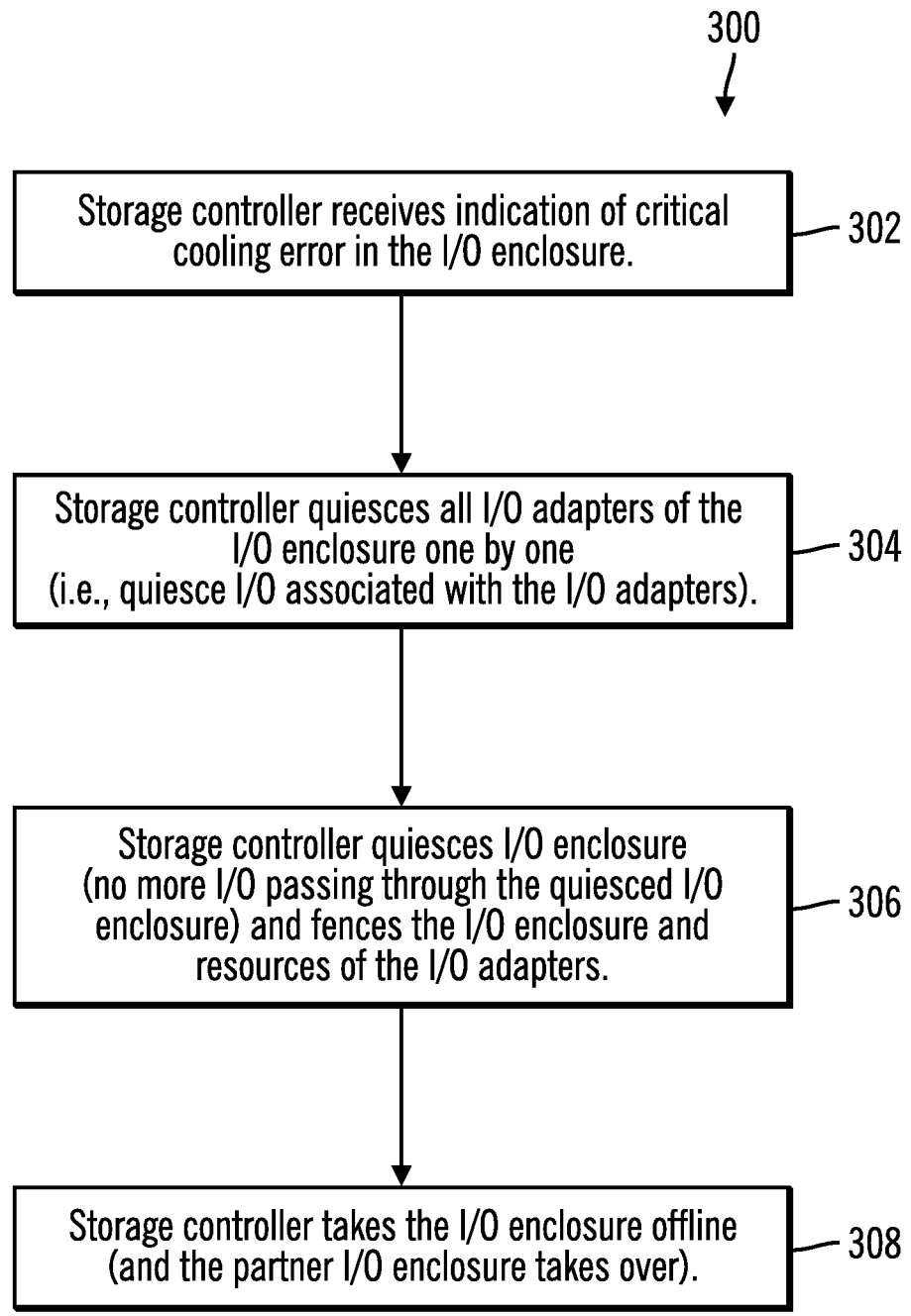
FIG. 3 illustrates a flowchart that shows how to gracefully take an I/O enclosure offline, in accordance with certain embodiments.

FIG. 3 illustrates a flowchart 300 that shows how to gracefully take an I/O enclosure offline, in accordance with certain embodiments.

Control starts at block 302, in which the storage controller 102 receives an indication of critical cooling error in the I/O enclosure 104. The storage controller 102 quiesces (at block 304) all I/O adapters 124 of the I/O enclosure 104 one by one. Quiesing an I/O adapter means that all I/O associated with the I/O adapter is quiesced (i.e., suspended or stopped).

Control proceeds to block 306 in which the storage controller 102 quiesces the I/O enclosure 104 and as a result no more I/O passes through the quiesced I/O enclosure. The storage controller 102 fences (i.e., isolates) the I/O enclosure 104 and the resources of the I/O adapters 124. Subsequently, at block 308, the storage controller 102 takes the I/O enclosure 104 offline and the partner I/O enclosure 204 takes over the functions performed by the I/O enclosure 104 that is now offline.

Figure 4:
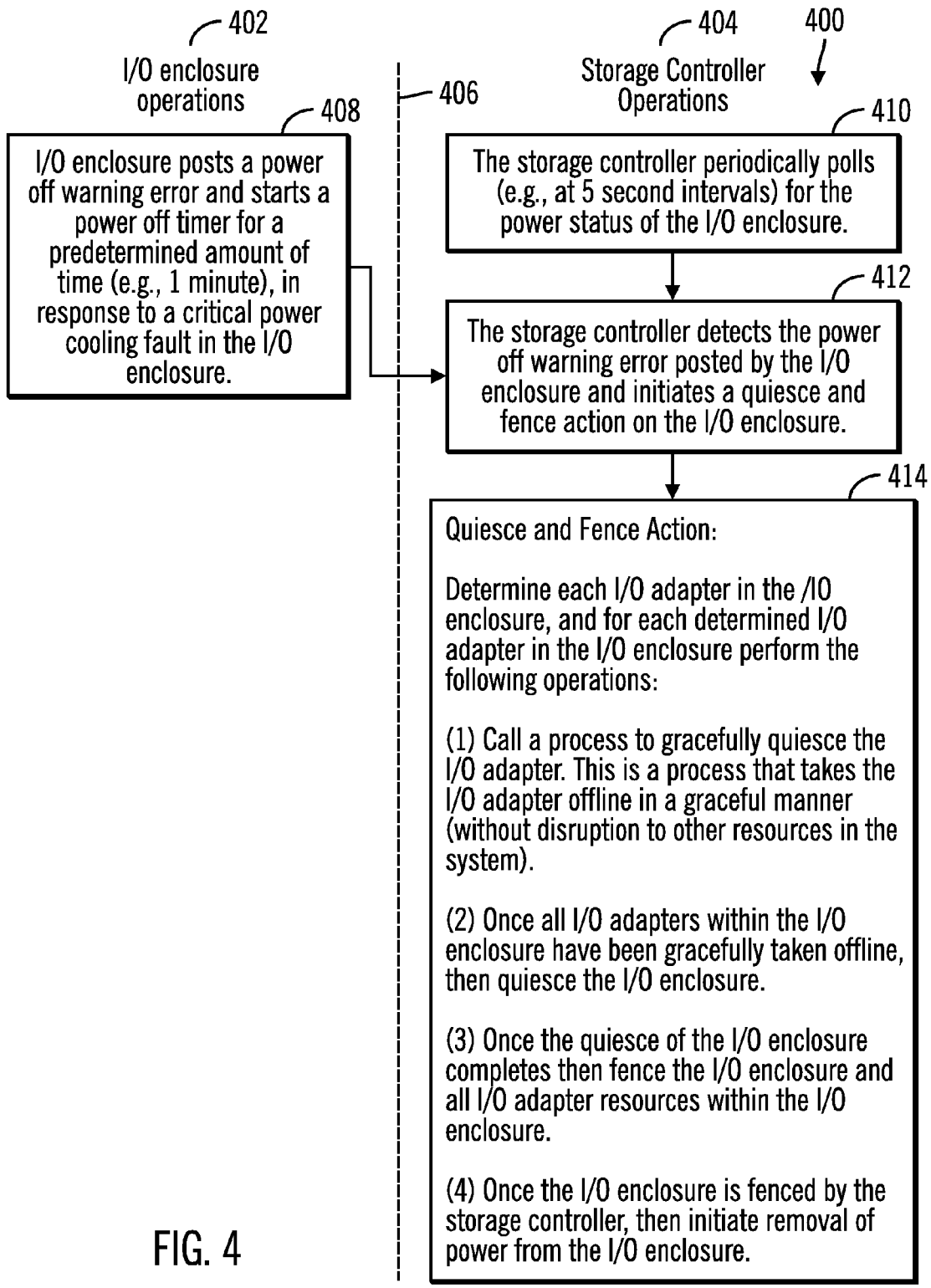
FIG. 4 illustrates a flowchart that shows operations performed by a storage controller and the I/O enclosure, for gracefully taking the I/O enclosure offline, in accordance with certain embodiments.

FIG. 4 illustrates a flowchart 400 that shows operations performed by the storage controller 102 and the I/O enclosure 104, for gracefully taking the I/O enclosure 104 offline, in accordance with certain embodiments. The I/O enclosure operations 402 are shown to the left of the dashed line 406 and the storage controller operations 404 are shown to the right of the dashed line 406.

Control starts at block 408 and 410, where in block 408 the I/O enclosure 104 posts a power off warning error and starts a power off timer for a predetermined amount of time (e.g., 1 minute), in response to a critical power cooling fault in the I/O enclosure 104. The critical power cooling fault in the I/O enclosure 104 may be caused by a malfunction of the fan 122 or for some other reason. In block 410, the storage controller initiates a process to periodically poll (e.g., at 5 second intervals) the power status of the I/O enclosure 104.

At block 412, the storage controller 102 detects the power off warning error posted by the I/O enclosure 104. The detection of the power off warning error is via the polling of the I/O enclosure 104 for the power status, where the polling was initiated at block 410. On detecting the power off warning error, the storage controller 102 initiates a "quiesce and fence" action on the I/O enclosure 104.

From block 412 control proceeds to block 414 in which the operations of the quiesce and fence action are shown.

The quiesce and fence action comprises determining each I/O adapter in the I/O enclosure, and for each determined I/O adapter in the I/O enclosure calling a process to gracefully quiesce the I/O adapter. This is a process that takes the I/O adapter offline in a graceful manner (without disruption to other resources in the system). Once all I/O adapters 124 within the I/O enclosure 104 have been gracefully taken offline, then the I/O enclosure 104 is quiesced.

Once the quiesce of the I/O enclosure 104 completes then the storage controller 102 fences the I/O enclosure 104 and all I/O adapter resources within the I/O enclosure 104. The mechanisms for fencing the I/O enclosure 104 and all I/O adapter resources within the I/O enclosure 104 may include considering whether I/O paths are affected by power off warning error, and using mechanisms to recover resources within the storage system with little or no impact to host I/O operations. For this, a process in the storage controller 102 considers I/O processing to be critical and minimizes its stoppage. All current processes on the storage controller 102 which are in use are stopped momentarily. In certain embodiments a determination is made as to which resources are impacted by the power off warning error, and only the impacted resources undergo the recovery sequence. Resources may be physical resources such as hardware devices or they may be virtual resources such as a code objects or code components. If a resource that caused error is not in an I/O path there is no need to perform error recovery sequence to recover the I/O path. If the resource that caused error is in the I/O path but it is not currently running I/O (i.e., not in available state) then an error recovery sequence that does not recover the I/O path is performed. Tasks associated with other resources (i.e., resources not impacted) only get paused for data collection, and then continue in the storage controller 102. In certain embodiments, although impacted resource(s) may stay offline for 30 seconds or more as they complete the recovery sequence, all tasks (including tasks associated with I/O) are only paused for a fraction of that time (in certain embodiments approximately 100 ms or less). This is important because if the pause is for an extended period of time, other resources may start being affected by errors. The host 106 is unaware that the I/O was paused, and to the host 106 it just appears as if the I/O took a little bit longer to complete as once the I/O enclosure 104 is fenced by the storage controller 102, then the storage controller 102 initiates the process for removal of power from the I/O enclosure 104.

Figure 5:
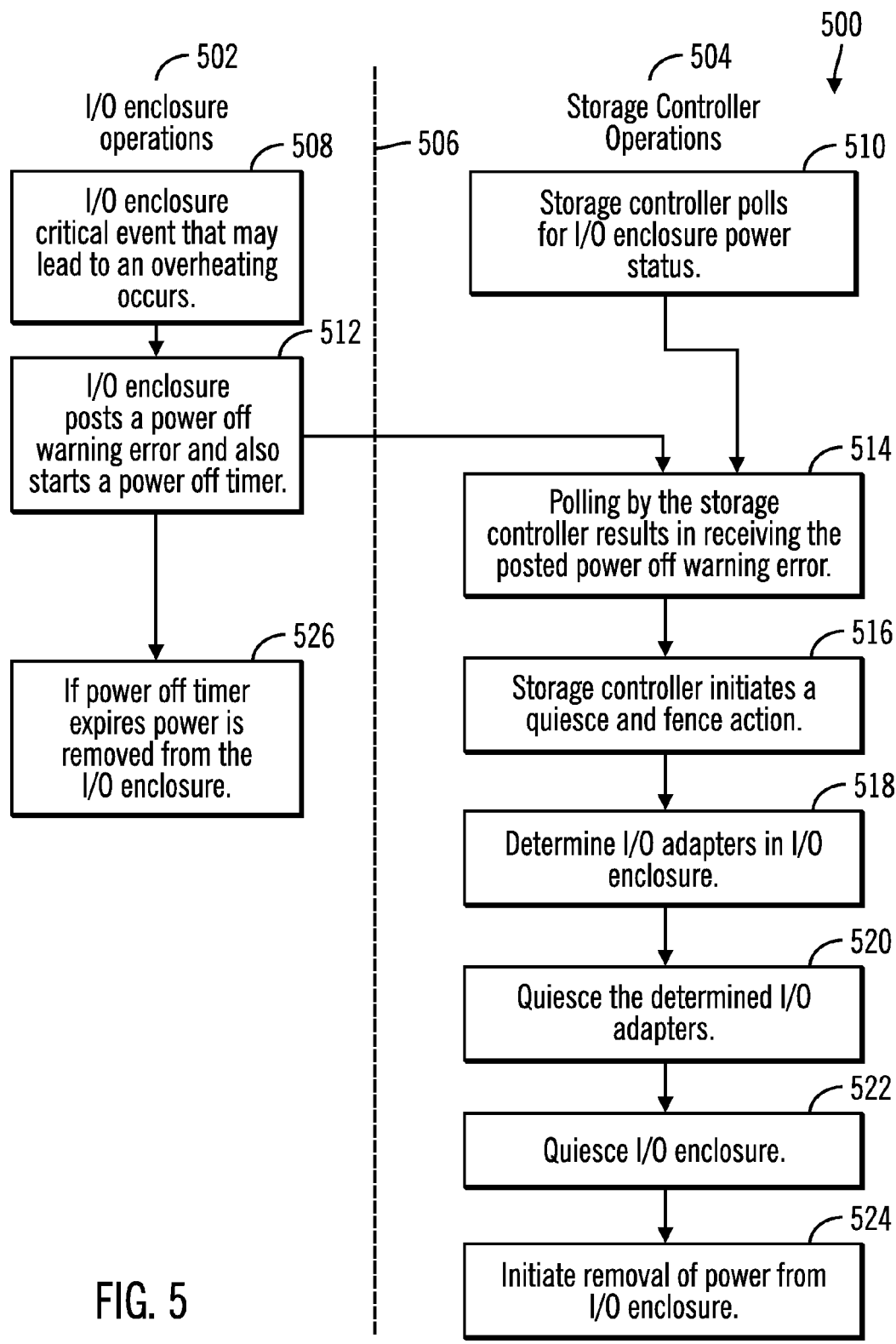
FIG. 5 illustrates another flowchart that shows operations performed by a storage controller and the I/O enclosure, for gracefully taking the I/O enclosure offline, in accordance with certain embodiments.

FIG. 5 illustrates another flowchart that shows operations performed by a storage controller 102 and the I/O enclosure 104, for gracefully taking the I/O enclosure 104 offline, in accordance with certain embodiments. The I/O enclosure operations 502 are shown to the left of the dashed line 506 and the storage controller operations 504 are shown to the right of the dashed line 506.

Control starts at block 508 in which an I/O enclosure critical event that may lead to an overheating occurs. The I/O enclosure 104 posts (at block 512) a power off warning error and also starts a power off timer that expires in a predetermined amount of time. In certain embodiments, the predetermined amount of time may be 60 seconds. If the power off timer expires then power is removed (at block 526) from the I/O enclosure 104. Thus there is a 60 second window of time (the predetermined amount of time) within which the storage controller 102 may gracefully quiesce the I/O adapters 124 and the I/O enclosure 104.

The storage controller 102 polls (at block 510) for I/O enclosure power status. The polling by the storage controller 102 results in receiving (at block 514) the posted power off warning error shown in block 512.

The storage controller 102 initiates (at block 516) a quiesce and fence action. The storage controller 102 determines (at block 518) all I/O adapters in the I/O enclosure 104 and then quiesces (at block 520) the determined I/O adapters. Subsequently the I/O enclosure 104 is quiesced (at block 522) and on fencing the I/O enclosure and all I/O adapter resources within the I/O enclosure, removal of power from the I/O enclosure 104 is initiated (at block 524).

Figure 6:
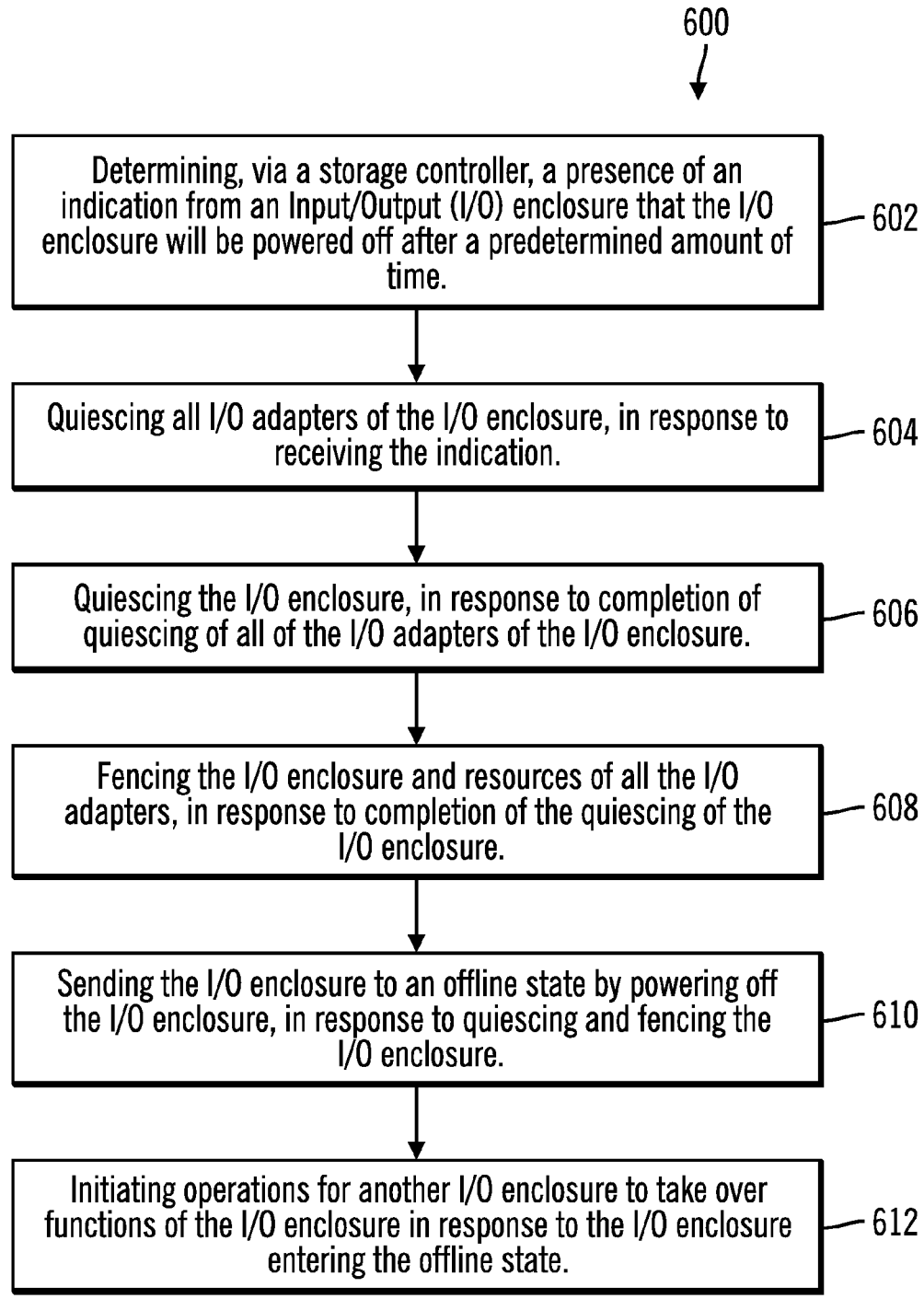
FIG. 6 illustrates a flowchart that shows operations performed by the storage controller, in accordance with certain embodiments.

FIG. 6 illustrates a flowchart 600 that shows operations performed by the storage controller 102, in accordance with certain embodiments. The operations performed by the storage controller 102 may be performed by an application that executes in one of the servers 114, 116 of the storage controller 102.

Control starts at block 602 in which the storage controller 102 determines a presence of an indication from an I/O enclosure 104 that the I/O enclosure 104 will be powered off after a predetermined amount of time. The storage controller 102 quiesces (at block 604) all I/O adapters 124 of the I/O enclosure 104, in response to receiving the indication. The storage controller 102 quiesces (at block 606) the I/O enclosure 104, in response to completion of quiescing of all of the I/O adapters 124 of the I/O enclosure 104.

Control proceeds to block 608 in which the storage controller 102 fences the I/O enclosure 104 and resources of all the I/O adapters 124, in response to completion of the quiescing of the I/O enclosure 104. Then the storage controller 102 sends (at block 610) the I/O enclosure 104 to an offline state by powering off the I/O enclosure 104, in response to quiescing and fencing the I/O enclosure 104.

Control proceeds to block 612 in which the storage controller 102 initiates operations for another I/O enclosure 204 to take over functions of the I/O enclosure 104 in response to the I/O enclosure 104 entering the offline state.

Therefore, FIGS. 1-6 illustrate certain embodiments for recovering resources within the storage system with little or no impact to host operations by gracefully quiescing and fencing an I/O enclosure before powering off the I/O enclosure. Subsequently, another I/O enclosure takes over the functions of the powered off I/O enclosure.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
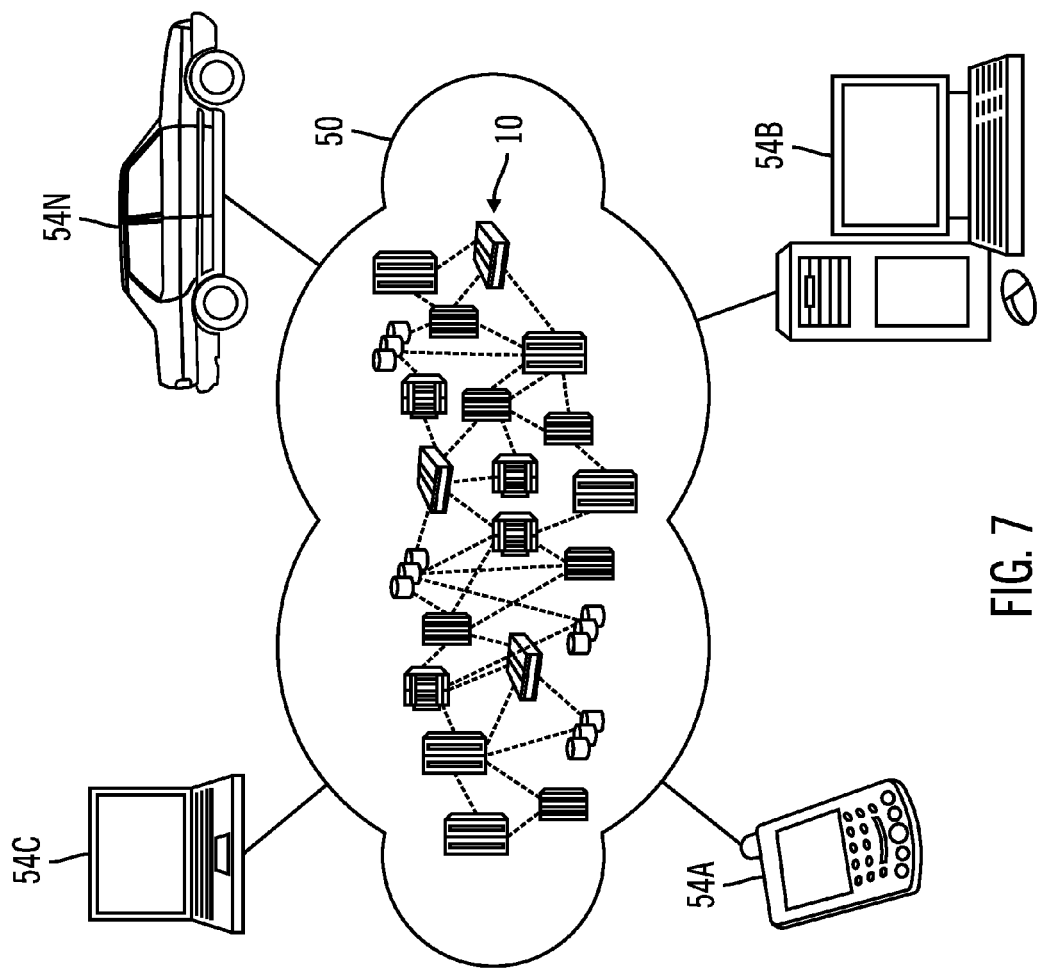
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
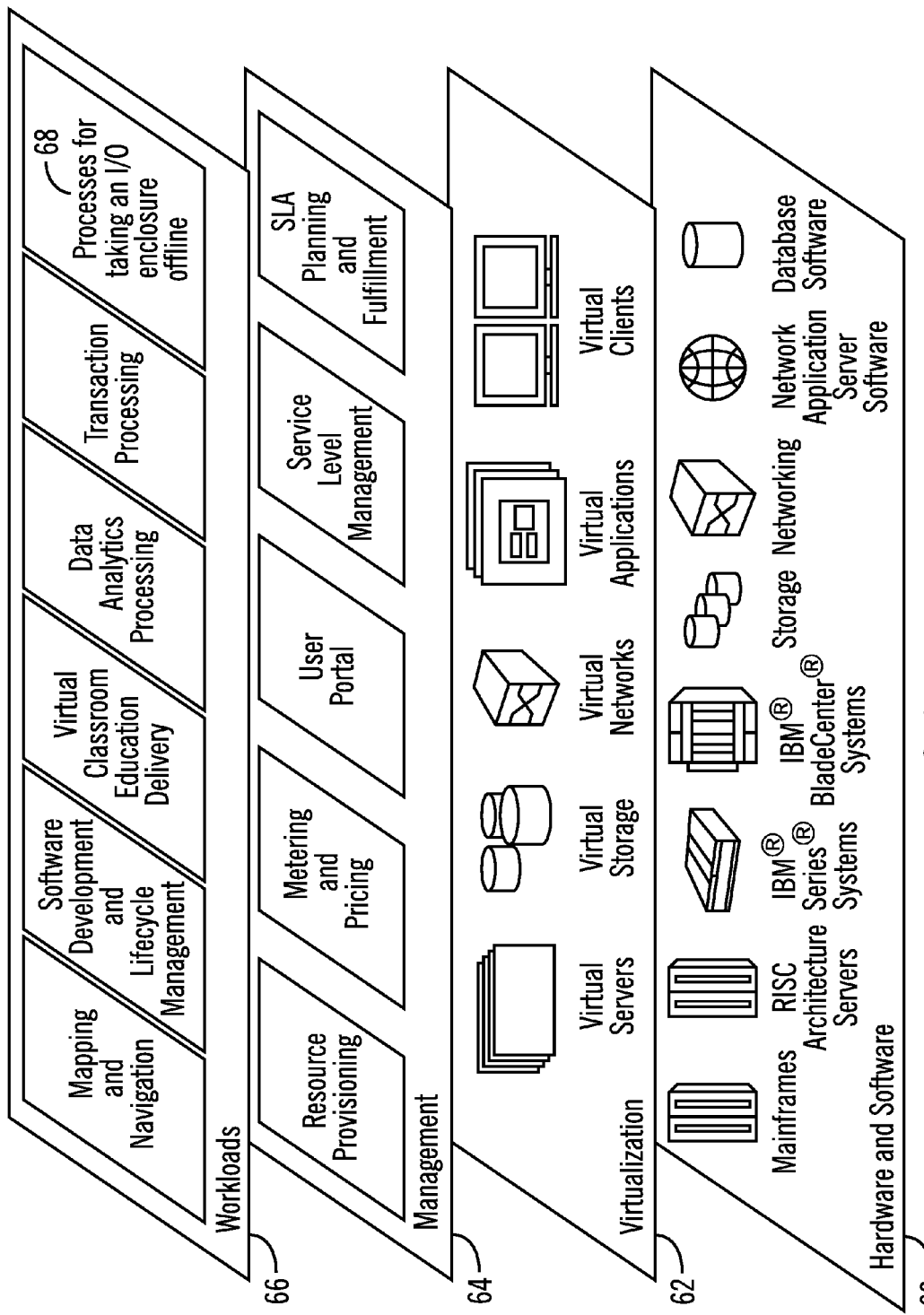
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the processes for taking an I/O enclosure offline 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
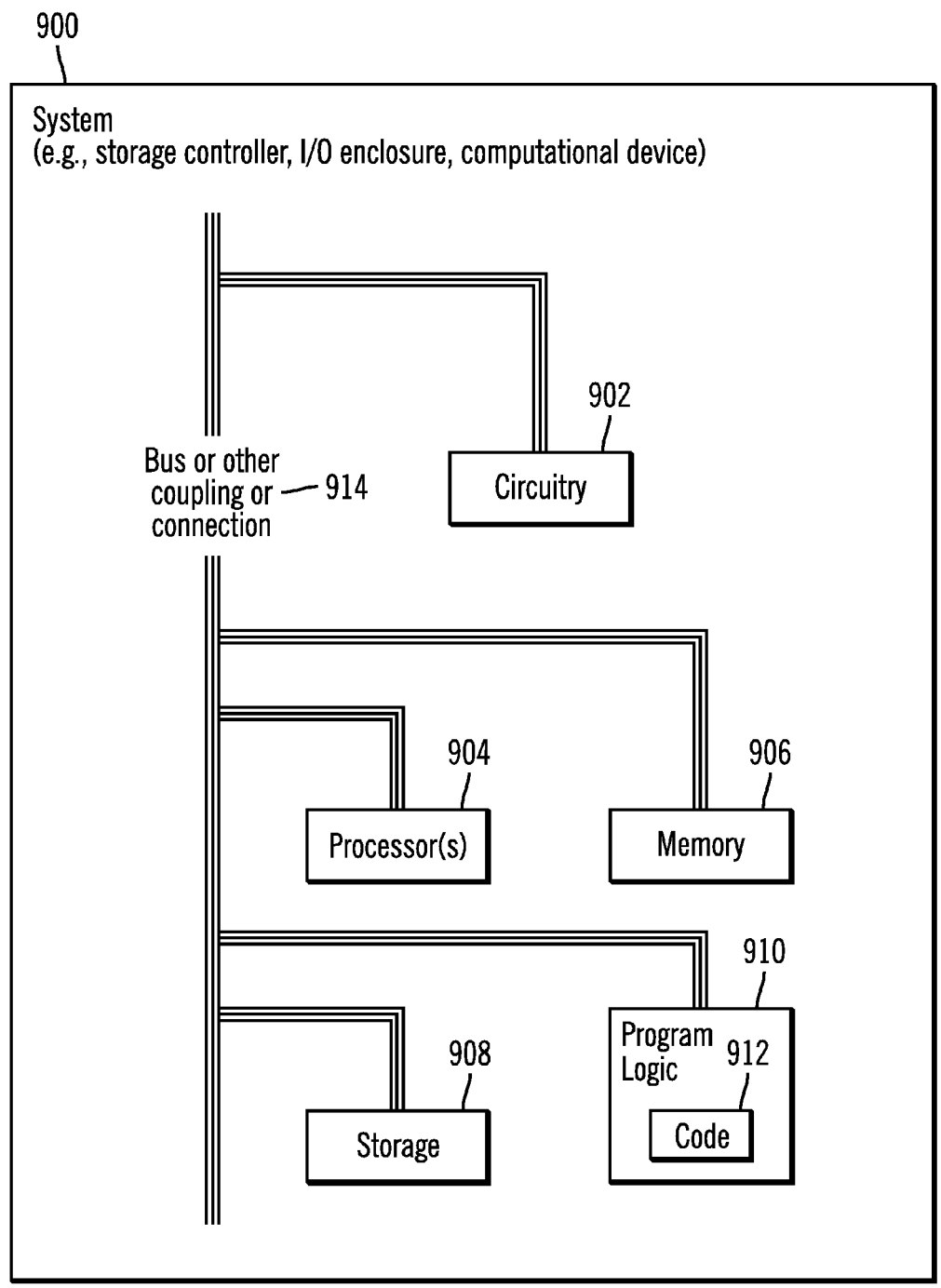
FIG. 9 illustrates a block diagram of a computational system that shows certain elements that may be included in the storage controller including servers shown in FIG. 1, in accordance with certain embodiments.

FIG. 9 illustrates a block diagram that shows certain elements that may be included in the storage controller 102, the servers 114, 116, the hosts 106, the I/O enclosure 104 or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   polling, by a storage controller, for power status of an Input/Output (I/O) enclosure, wherein a plurality of I/O adapters are included within the I/O enclosure;
   in response to the polling, receiving, by the storage controller, a power off warning error posted by the I/O enclosure to determine that the I/O enclosure will be powered off after a predetermined amount of time;
   initiating, by the storage controller, quiesce and fence operations on the I/O enclosure within which the plurality of I/O adapters are included, wherein the quiesce and fence operations comprise:
   determining each I/O adapter of the plurality of I/O adapters included within the I/O enclosure, and for each determined I/O adapter calling a process to gracefully quiesce the determined I/O adapter, wherein on graceful quiescing of the determined I/O adapter the determined I/O adapter is taken offline without disruption to other resources besides resources of the determined I/O adapter;
   in response to all the I/O adapters within the I/O enclosure being taken offline, quiescing the I/O enclosure;
   in response to completion of the quiescing of the I/O enclosure, fencing the I/O enclosure and resources of all the I/O adapters within the I/O enclosure; and
   in response to the fencing of the I/O enclosure and all the resources of all the I/O adapters within the I/O enclosure, initiating, by the storage controller, removal of power from the I/O enclosure; and,
   wherein if the I/O enclosure is not sent to an offline state by being powered off by the storage controller within the predetermined amount of time, the I/O enclosure is powered off after an expiry of the predetermined amount of time.

2. The method of claim 1, wherein the I/O enclosure is a first I/O enclosure, wherein a second I/O enclosure takes over functions of the first I/O enclosure in response to the first I/O enclosure entering the offline state.

3. The method of claim 1, wherein if the storage controller initiates the removal of power from the I/O enclosure within the predetermined amount of time then there is lesser impact on host operations in comparison to powering off the I/O enclosure without initiating the removal of power, by the storage controller, from the I/O enclosure within the predetermined amount of time.

4. The method of claim 1, wherein during the fencing of the I/O enclosure and the resources of all the I/O adapters within the I/O enclosure an error recovery sequence is performed to recover an I/O path for any resource that is impacted by the power off warning error.

5. The method of claim 1, wherein during the fencing of the I/O enclosure and the resources of all the I/O adapters within the I/O enclosure an error recovery sequence that does not recover an I/O path is performed if a resource that caused error in in the I/O path but is not running I/O.

6. A system, comprising:
   a memory; and
   a processor coupled to the memory, wherein the processor performs operations, the operations comprising:
   polling for power status of an Input/Output (I/O) enclosure, wherein a plurality of I/O adapters are included within the I/O enclosure;
   in response to the polling, receiving a power off warning error posted by the I/O enclosure to determine that the I/O enclosure will be powered off after a predetermined amount of time;
   initiating quiesce and fence operations on the I/O enclosure within which the plurality of I/O adapters are included, wherein the quiesce and fence operations comprise:
   determining each I/O adapter of the plurality of I/O adapters included within the I/O enclosure, and for each determined I/O adapter calling a process to gracefully quiesce the determined I/O adapter, wherein on graceful quiescing of the determined I/O adapter the determined I/O adapter is taken offline without disruption to other resources besides resources of the determined I/O adapter;
   in response to all the I/O adapters within the I/O enclosure being taken offline, quiescing the I/O enclosure;
   in response to completion of the quiescing of the I/O enclosure, fencing the I/O enclosure and resources of all the I/O adapters within the I/O enclosure; and
   in response to the fencing of the I/O enclosure and all the resources of all the I/O adapters within the I/O enclosure, initiating removal of power from the I/O enclosure; and,
   wherein if the I/O enclosure is not sent to an offline state by being powered off by the storage controller within the predetermined amount of time, the I/O enclosure is powered off after an expiry of the predetermined amount of time.

7. The system of claim 6, wherein the I/O enclosure is a first I/O enclosure, wherein a second I/O enclosure takes over functions of the first I/O enclosure in response to the first I/O enclosure entering the offline state.

8. The system of claim 6, wherein if the system initiates the removal of power from the I/O enclosure within the predetermined amount of time then there is lesser impact on host operations in comparison to powering off the I/O enclosure without initiating the removal of power, by the system, from the I/O enclosure within the predetermined amount of time.

9. The system of claim 6, wherein during the fencing of the I/O enclosure and the resources of all the I/O adapters within the I/O enclosure an error recovery sequence is performed to recover an I/O path for any resource that is impacted by the power off warning error.

10. The system of claim 6, wherein during the fencing of the I/O enclosure and the resources of all the I/O adapters within the I/O enclosure an error recovery sequence that does not recover an I/O path is performed if a resource that caused error in in the I/O path but is not running I/O.

11. A computer program product, the computer program product comprising a computer readable storage medium having computer readable program code embodied therewith, the computer readable program code configured to perform operations on a storage controller, the operations comprising:

polling, by the storage controller, for power status of an Input/Output (I/O) enclosure, wherein a plurality of I/O adapters are included within the I/O enclosure;

in response to the polling, receiving, by the storage controller, a power off warning error posted by the I/O enclosure to determine that the I/O enclosure will be powered off after a predetermined amount of time;

initiating, by the storage controller, quiesce and fence operations on the I/O enclosure within which the plurality of I/O adapters are included, wherein the quiesce and fence operations comprise:

determining each I/O adapter of the plurality of I/O adapters included within the I/O enclosure, and for each determined I/O adapter calling a process to gracefully quiesce the determined I/O adapter, wherein on graceful quiescing of the determined I/O adapter the determined I/O adapter is taken offline without disruption to other resources besides resources of the determined I/O adapter;

in response to all the I/O adapters within the I/O enclosure being taken offline, quiescing the I/O enclosure;

in response to completion of the quiescing of the I/O enclosure, fencing the I/O enclosure and resources of all the I/O adapters within the I/O enclosure; and in response to the fencing of the I/O enclosure and all the resources of all the I/O adapters within the I/O enclosure, initiating, by the storage controller, removal of power from the I/O enclosure; and, wherein if the I/O enclosure is not sent to an offline state by being powered off by the storage controller within the predetermined amount of time, the I/O enclosure is powered off after an expiry of the predetermined amount of time.

12. The computer program product of claim 11, wherein the I/O enclosure is a first I/O enclosure, wherein a second I/O enclosure takes over functions of the first I/O enclosure in response to the first I/O enclosure entering the offline state.

13. The computer program product of claim 11, wherein if the storage controller initiates the removal of power from the I/O enclosure within the predetermined amount of time then there is lesser impact on host operations in comparison to powering off the I/O enclosure without initiating the removal of power, by the storage controller, from the I/O enclosure within the predetermined amount of time.

14. The computer program product of claim 11, wherein during the fencing of the I/O enclosure and the resources of all the I/O adapters within the I/O enclosure an error recovery sequence is performed to recover an I/O path for any resource that is impacted by the power off warning error.

15. The computer program product of claim 11, wherein during the fencing of the I/O enclosure and the resources of all the I/O adapters within the I/O enclosure an error recovery sequence that does not recover an I/O path is performed if a resource that caused error in in the I/O path but is not running I/O.

* * * * *